United States Patent
Garrett et al.

(10) Patent No.: US 10,835,929 B1
(45) Date of Patent: Nov. 17, 2020

(54) INVENTORY SHELVING WITH MOVABLE BARRIER TO OBSTRUCT PATHWAY TO HIGH-ENERGY EQUIPMENT

(71) Applicant: Amazon Technologies, Inc., Seattle, WA (US)

(72) Inventors: Samuel Gardner Garrett, Seattle, WA (US); Vinay Balan, Seattle, WA (US); Emily Dunne, Seattle, WA (US); Akshay Tilekar, Seattle, WA (US); Unnikrishnan Vadakkanmaruveedu, Chandler, AZ (US)

(73) Assignee: Amazon Technologies, Inc., Seattle, WA (US)

( * ) Notice: Subject to any disclaimer, the term of this patent is extended or adjusted under 35 U.S.C. 154(b) by 148 days.

(21) Appl. No.: 15/860,935

(22) Filed: Jan. 3, 2018

(51) Int. Cl.
*B07C 3/08* (2006.01)
*B65G 1/04* (2006.01)

(52) U.S. Cl.
CPC .......... *B07C 3/087* (2013.01); *B65G 1/0492* (2013.01); *B65G 2207/40* (2013.01)

(58) Field of Classification Search
CPC .. B07C 3/087; B65G 1/0492; B65G 2207/40; B65G 19/42; B65G 2201/0267
See application file for complete search history.

(56) References Cited

U.S. PATENT DOCUMENTS

| | | | | |
|---|---|---|---|---|
| 3,618,803 A | * | 11/1971 | Dobberkau | B65D 88/127 220/1.5 |
| 4,646,928 A | * | 3/1987 | Ono | B65D 88/524 220/1.5 |
| 6,722,512 B2 | * | 4/2004 | Scully | A47F 5/13 211/175 |
| 10,023,385 B2 | * | 7/2018 | Shibata | B65G 1/0485 |
| 2013/0276679 A1 | * | 10/2013 | Kroeplien | A47F 7/00 109/73 |

* cited by examiner

*Primary Examiner* — Ko H Chan
(74) *Attorney, Agent, or Firm* — BakerHostetler

(57) ABSTRACT

In one embodiment, a shelving unit has first and second sides, a frame, and a barrier. The frame defines a storage bay between the first and second sides, a first opening at the first side, and a second opening at the second side. The second opening receives a storage bin therethrough and into the storage bay. The first opening receives inventory items therethrough and into the storage bin when the storage bin is disposed in the storage bay. The barrier moves between (i) an open position, where the first opening is open to the storage bay so as to allow inventory items to be passed therethrough and into the storage bin, and (ii) a closed position, where the barrier at least partially obstructs at least one of the first and second openings so as to impede a human from reaching through the storage bay when the storage bin is removed.

20 Claims, 10 Drawing Sheets

INVENTORY SHELVING WITH MOVABLE BARRIER TO OBSTRUCT PATHWAY TO HIGH-ENERGY EQUIPMENT

BACKGROUND

The present disclosure relates to inventory storage systems such as shelving units for storing storage bins. Commonly, in inventory processing facilities such as warehouses and distribution centers, inventory items are transferred around the processing facilities in open-top storage bins. Further, the inventory items are often stored in the storage bins on shelving units until the inventory items are needed to fulfill or complete a customer order. At such time, a human or robot may remove the storage bins from the shelving units and retrieve the inventory items for downstream processing such as sorting and/or packaging.

BRIEF DESCRIPTION OF THE DRAWINGS

The following detailed description will be better understood when read in conjunction with the appended drawings, in which there is shown in the drawings example embodiments for the purposes of illustration. It should be understood, however, that the present disclosure is not limited to the precise arrangements and instrumentalities shown. In the drawings.

DETAILED DESCRIPTION

Figure 1:
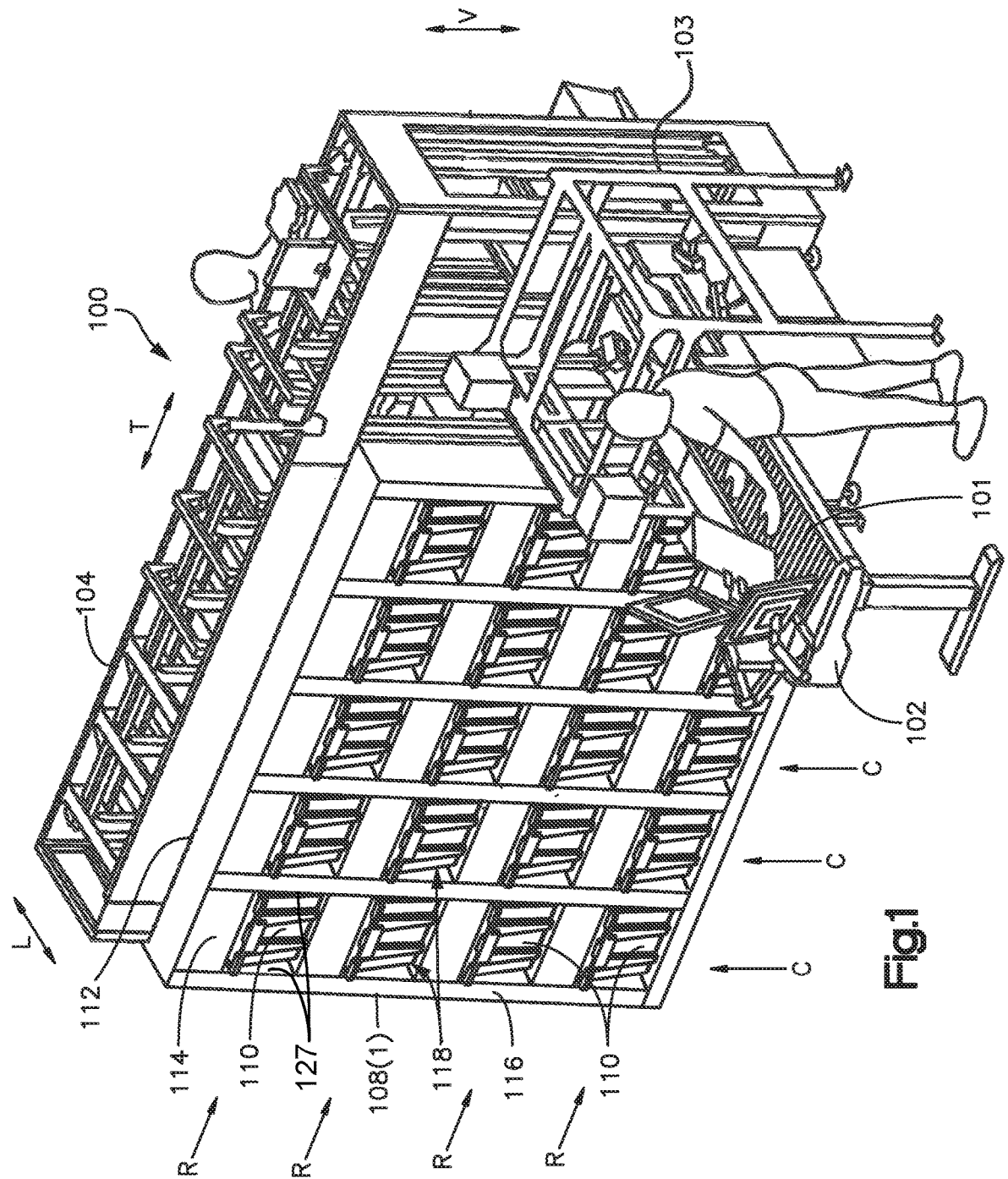
FIG. 1 shows a perspective view of a sorting system according to one embodiment.
Figure 2:
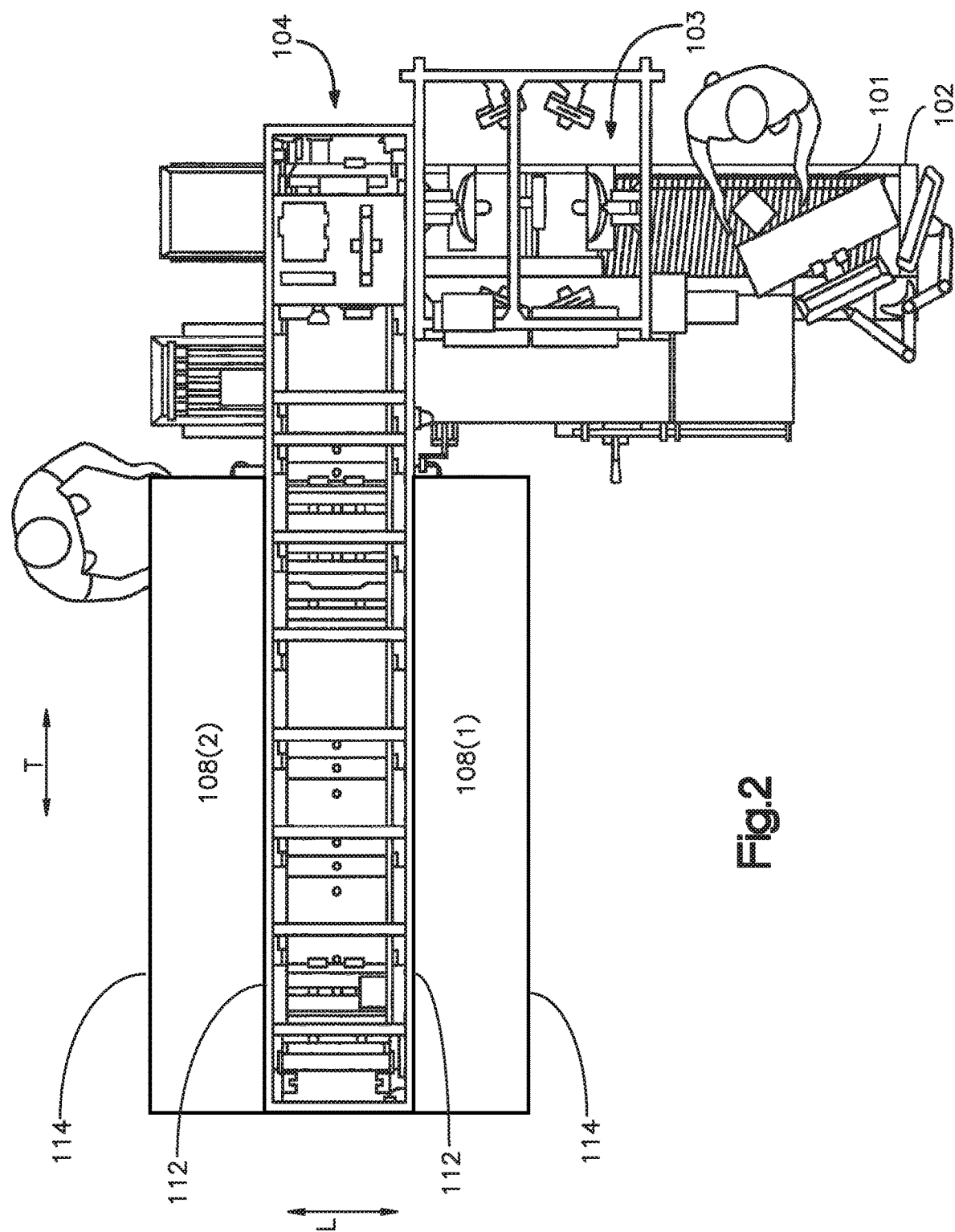
FIG. 2 shows a top view of the sorting system of FIG. 1.
Figure 3:
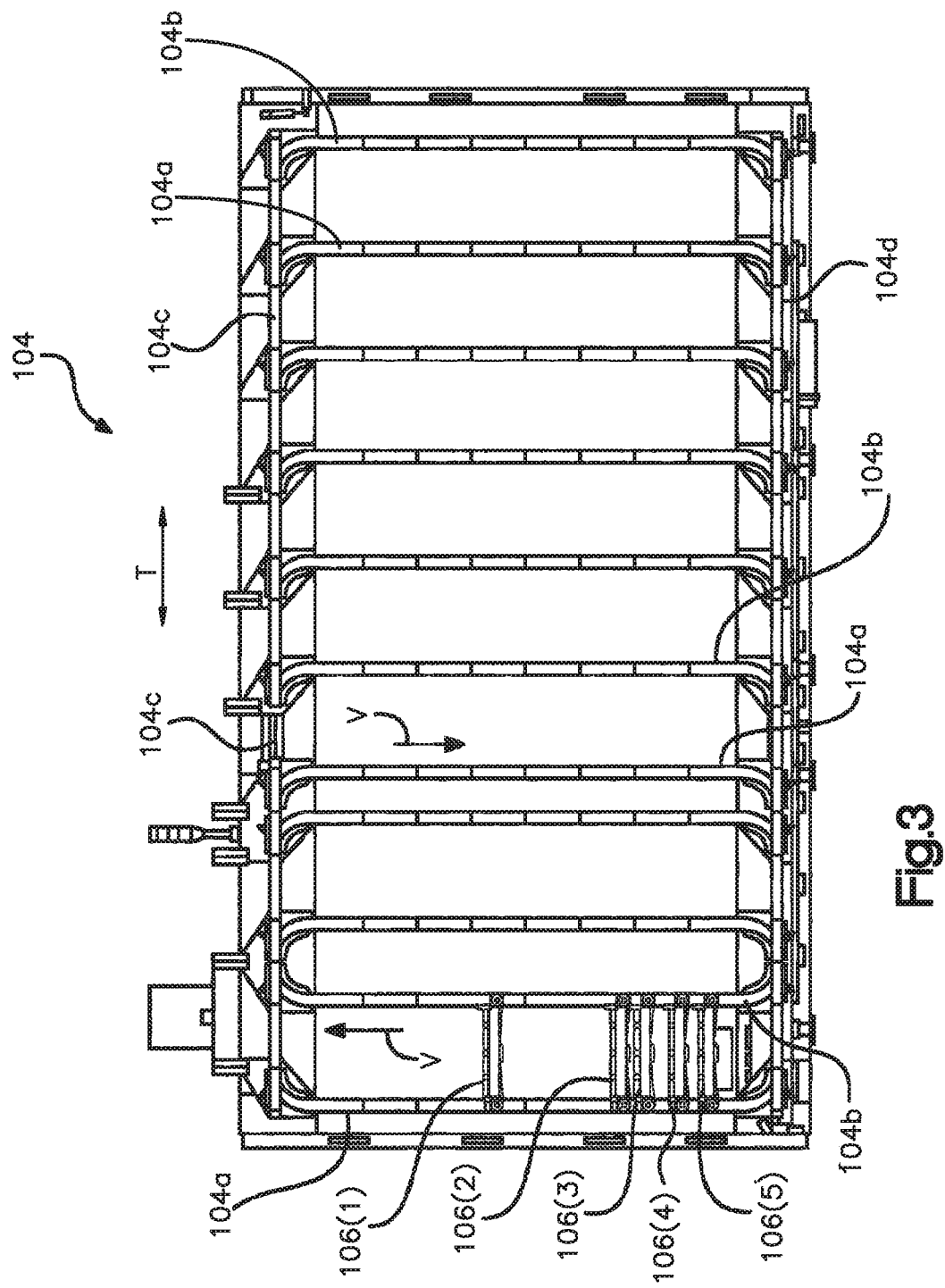
FIG. 3 shows a cross-sectional elevation view of the sorting system of FIG. 1.
Figure 4:
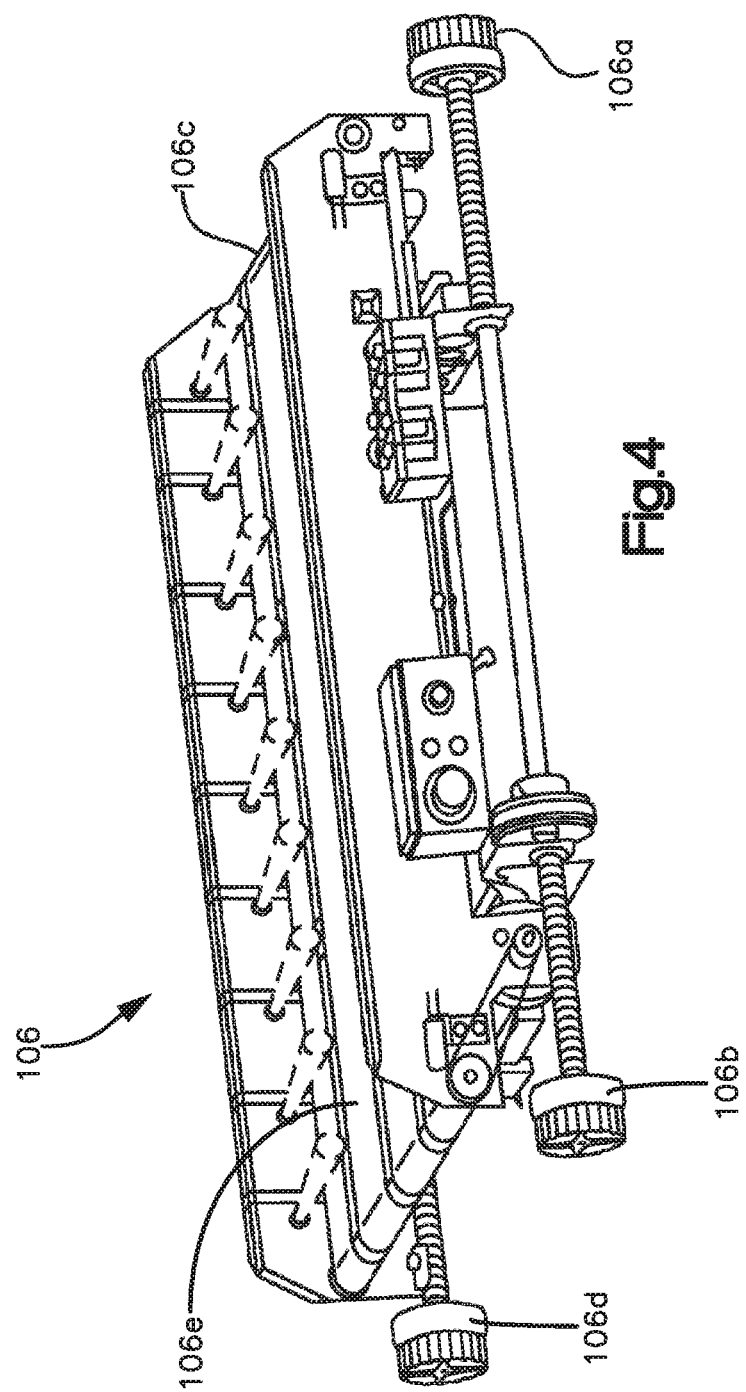
FIG. 4 shows a perspective view of a delivery vehicle of the sorting system of FIG. 1.

In inventory processing facilities, inventory items are commonly stored and transported in storage bins (also referred to as totes) and transported around the facilities in the bins. Sometimes, high-energy equipment such as heavy and/or rapidly moving conveyors, robots, or delivery vehicles are used to deliver inventory items into the storage bins. However, exposure to such high-energy equipment can present hazards to human operators in inventory processing facilities.

For example, OPEX Corporation's Sure Sort system sorts inventory items into storage bins that are supported by shelves. The Sure Sort system is described in PCT patent publication no. WO 2017/123678, which is incorporated herein by reference as if set forth in its entirety herein. The inventory items are delivered to the storage bins by delivery vehicles, referred to as iBOTs, which move vertically and/or horizontally along a track system that is disposed at an inner side of the shelves. Once a delivery vehicle is vertically and horizontally aligned with a desired storage bin supported by one of the shelves, the delivery vehicle moves the inventory item into the desired storage bin. Meanwhile, human operators interact with the storage bins at an outer side of the shelves. In particular, the operators remove the storage bins from the shelves when the inventory items are ready for processing downstream of the sorting system, and stow storage bins onto the shelves for the sorting of inventory items. However, if a human operator were to come into contact with a delivery vehicle on the inner side of the shelves by, for example, reaching through the shelves, then the human operator could be injured by the delivery vehicle. Various embodiments of the present disclosure can limit such contact or eliminate such contact altogether.

Turning to FIGS. 1 to 4, an inventory processing system 100 is shown according to one embodiment. The processing system 100 can be a sorting system or other type of system. In general, the processing system 100 has an induction station 102, a track system 104, at least one delivery vehicle 106, and at least one shelving unit 108. In one example, the processing system 100 can have a pair of shelving units 108(1) and 108(2). The shelving units 108(1) and 108(2) can be spaced from one another along a longitudinal direction L. Further, the track system 104 can be disposed between the pair of shelving units 108(1) and 108(2). It will be understood that, in alternative embodiments, inventory processing systems of the disclosure can have as few as one shelving unit or more than two shelving units.

Each shelving unit 108 has a first side 112 and a second side 114 that are spaced from one another along the longitudinal direction L. The first side 112 can be disposed closer to the track system 104 than the second side 114. Thus, the first side 112 can be considered an inner side, and the second side 114 can be considered an outer side. Each shelving unit 108 has a frame 116 that defines at least one storage bay 118, such as a plurality of storage bays 118, between the first and second sides 112 and 114. The storage bays 118 can be arranged in at least one row R that extends along the transverse direction T. For example, the storage bays 118 can be arranged in a plurality of rows R that extend along the transverse direction T, and that are offset from one another the vertical direction V. The shelving unit 108 of FIG. 1 can include a plurality of shelves that extend along a horizontal plane defined by the transverse direction and the longitudinal direction L and that are spaced from one another along the vertical direction V. Each shelf can at least partially define a row of the storage bays 118. The storage bays 118 can be arranged in at least one column C that extends along the vertical direction V. For example, the storage bays 118 can be arranged in a plurality of columns C that extend along the vertical direction V and that are offset from one another along transverse direction T. Thus, the storage bays 118 can be arranged in a one- or two-dimensional array of storage bays 118.

Each storage bay 118 defines a void that is configured to support a storage bin 110, which is configured to support a plurality of inventory items. Preferably, the storage bins 110 are open-top plastic totes configured to carry items in an e-commerce supply chain. The storage bins are of a size that an individual person or robot can lift. For example, each storage bin 110 can be a rectangular structure, such as a bin or tote, formed from a rigid material such as plastic, wood, aluminum, or other suitable material. Each storage bin 110 (see e.g., FIG. 5) can have a first sidewall 110a, and a second sidewall 110b that is spaced from the first sidewall 110a along the transverse direction T. Each storage bin 110 can have a first end wall 110c, and a second end wall 110d that is spaced from the first end wall 110c along the longitudinal direction L. Each storage bin 110 can further an upper end 110e and a bottom surface 110f spaced from one another along the vertical direction V. The bottom surface 110f can extend between the opposed sidewalls 110a and 110b and between the opposed end walls 110c and 110d. The upper end 110e can be open for ease of access in placing inventory items into, and retrieving inventory items from, the storage bin 110. Each storage bin 110 can have an overall bin width WBIN along the transverse direction T, an overall bin height HBIN along the vertical direction V, and an overall bin length LBIN along the longitudinal direction L. In some embodiments, the overall length LBIN can be greater than at least one of the overall width WBIN and the overall height HBIN. In other embodiments, the storage bins 110 can be alternatively sized. For example, in some other embodiments, the overall width WBIN can be greater than at least one of the overall length LBIN and the overall height HBIN.

The inventory processing system 100 is configured to deliver inventory items into the storage bins 110. The inventory items can be sorted by customer order or by another desired sorting criteria. For example, each storage bin 110 can correspond to a single customer order, where each customer order comprises one or more inventory items. The induction station 102 is configured to receive inventory items that are to be sorted, where each inventory item can be packaged or unpackaged. Each inventory item is identified at the induction station 102 by detecting a characteristic of the inventory item, and a desired storage bin 110 in which the inventory item is to be sorted is identified based on the detected characteristic. For example, the induction station 102 can include at least one scanner 103 configured to scan barcodes on the inventory items, and the desired storage bin 110 can be the storage bin for a customer order that corresponds to the barcode. The induction station 102 can include a conveyor 101 that conveys the inventory item to a loading position of the track system 104, where the inventory item is loaded onto a delivery vehicle 106.

The track system 104 can include a plurality of vertical tracks 104a and 104b that extend along the vertical direction V. The vertical tracks can include at least one pair of tracks 104a and 104b, and individual pairs of the tracks can correspond to a column of the storage bays 118. The tracks 104a and 104b in each pair can be spaced from one another along the transverse direction T. Additionally, the pairs of tracks can be spaced from one another along the transverse direction T. The track system 104 can further include a plurality of horizontal connecting tracks 104c and 104d that extend along the transverse direction T. The horizontal connecting tracks 104c and 104d can be spaced from one another along the vertical direction V, and can connect the pairs of vertical tracks 104a and 104b to one another. For example, the vertical tracks can extend from one of the connecting tracks 104c to another one of the connecting tracks 104d. It will be understood that in alternative embodiments the track system 104 can be configured in the other manners. For example, the tracks of the track system 104 can be extend along alternative paths.

The delivery vehicle 106 is configured to carry the inventory item along the track system 104 along at least one of a vertical direction V along the vertical tracks and a transverse direction T along the connecting tracks until the delivery vehicle 106 is vertically and horizontally aligned with a desired storage bin 110. The delivery vehicle 106 can be a semi-autonomous vehicle and may have an onboard power source and an onboard motor to drive the delivery vehicle 106 along the track system 104. The delivery vehicle 106 can include four wheels, including two forward wheels 106a and 106b and two rearward wheels 106c and 106d. The forward wheels 106a and 106b ride in a first track 104a of each pair of tracks, while the rearward wheels 106b ride in the second track 104b of each pair of tracks. The delivery vehicle 106 can include a loading/unloading mechanism 106e, such as a conveyor, for loading inventory items onto the delivery vehicle 106 and discharging the items from the delivery vehicle 106 into a desired storage bin 110 when the delivery vehicle 106 is vertically and horizontally aligned with the storage bay 118 in which the storage bin 110 is supported.

Once the filling of a storage bin 110 is complete (e.g., when all inventory items of customer order are sorted into the storage bin 110), a human operator can remove the storage bin 110 from the second side 114 of the corresponding shelving unit 108(1) or 108(2). Further, the human operator can replace the removed storage bin 110 with another storage bin 110 or the storage bin 110 after its contents have been emptied. To limit contact between the human operator and the delivery vehicles 106 when a storage bin 110 is removed from a storage bay 118, the storage bay 118 can be implemented with a barrier mechanism 125 that includes a movable barrier 124 as will be described in relation to FIGS. 5 to 10 below. Each barrier 124 can be configured to move between (i) an open position when a storage bin 110 is disposed in the corresponding storage bay 118 so as to allow inventory items to be moved into the storage bin 110, and (ii) a closed position when the storage bin 110 is at least partially removed from the storage bay 118 so as to limit possible contact between a human operator and the at least one delivery vehicle 106.

Referring to FIGS. 5 to 7 and FIGS. 8 to 10, embodiments of a storage bay 118 of a shelving unit 108 of FIG. 1 are shown with a storage bin 110 in various positions. It will be understood that one or more, up to all, of the storage bays 118 of FIG. 1 can be implemented as shown in FIGS. 5 to 7 or FIGS. 8 to 10. Generally, the storage bay 118 is defined between the first and second sides 112 and 114 of the shelving unit 108. The storage bay 118 has a top end 118a and a bottom end 118b that are spaced from one another along the vertical direction V so as to define a height HBAY of the storage bay 118. The top end 118a can be defined by a shelf of the shelving unit 108 that is disposed above the storage bay 118 or can be defined by the frame 116 or other structure of the shelving unit 108. Similarly, the bottom end 118b can be defined by a shelf of the shelving unit 108 that is disposed below the storage bay 118 or can be defined by the frame 116 or other structure of the shelving unit 108. The storage bay 118 has a first transverse side 118c and a second transverse side 118d that are spaced from one another along the transverse direction T so as to define a width WBAY of the storage bay 118. The storage bay 118 can have a length LBAY along the longitudinal direction L. The length LBAY can be defined from the first end 112 to the second end 114 of the shelving unit 108.

The storage bay 118 has an upper bay portion 118e, and a lower bay portion 118f that is disposed below the upper bay portion 118c along the vertical direction V. The upper bay portion 118e can extend from the top end 118a towards the bottom end 118b. The lower bay portion 118f can extend from the bottom end 118b towards the top end 118a. The lower bay portion 118f defines a void that is sized and configured to support the storage bin 110. For example, the lower bay portion 118f can have a height HLBAY from the bottom end 118b to the upper bay portion 118e that is at least as great as the height HBIN of the storage bin 110. The lower bay portion 118f can have a width that is at least as great as a width WBIN of the storage bin 110, where the width can be equal to the width WBAY of the storage bay 118. The lower bay portion 118f can have a length that is at least as great as a length LBIN of the storage bin 110, where the length can be equal to the length LBAY of the storage bay 118. Thus, the storage bin 110 can reside entirely within the lower bay portion 118f when the storage bin 110 is disposed in the storage bay 118.

The upper bay portion 118e is disposed above the lower bay portion 118f and defines a void that is sized and configured to receive inventory items therethrough and into the open top of the storage bin 110 when the storage bin 110 is disposed in the lower bay portion 118f. Thus, the upper bay portion 118e is disposed above the storage bin 110 when the storage bin 110 is disposed in the lower bay portion 118f. The upper bay portion 118e can have a height HUBAY. The height HBAY of the storage bay 118 can be equal to the height HLBAY plus the height HUBAY.

The storage bay 118 can include a first side wall 127 at the first transverse side 118c and a second sidewall 127 at the second transverse side 118d (see e.g., FIG. 1). Note that the sidewalls 127 are omitted from FIGS. 5-10 for clarity. The sidewalls 127 can extend between the top end 118a and the bottom end 118b, and between the first and second sides 112 and 114. In one embodiment, the sidewalls 127 can extend from the top end 118a to the bottom end 118b. In another embodiment, the sidewalls 127 can be partial walls that extend from the top end 118a towards the bottom end 118b but terminate before the bottom end 118b. For example, the partial walls can be aligned with the upper bay portion 118e along the transverse direction T. Thus, the sidewalls 127 can obstruct access between adjacent storage bays 118, such as between the upper portions 118e of the storage bays 118.

The frame 116 or shelving unit 108 defines, for each storage bay 118, a first opening 120 at the first side 112, and a second opening 122 at the second side 114. The first opening 120 is configured to receive inventory items therethrough and into a storage bin 110 stored in the storage bay 118. The second opening 122 is configured to receive storage bins 110 therethrough and into the storage bay 118. The first opening 120 is open to the storage bay 118 when the barrier 124 is in the open position. The first opening 120 extends between the top end 118a and the bottom end 118b at the first side 112. For example, the first opening 120 can extend from the top end 118a towards the bottom end 118b. At least a portion of the first opening 120 is aligned with the upper bay portion 118e of the storage bay 118 along the longitudinal direction L. Thus, the first opening 120 is configured to receive inventory items therethrough along the longitudinal direction L and into the open top of the storage bin 110 when the storage bin 110 is disposed in the storage bay 118.

The second opening 122 is defined at the second side 114 and is open to the storage bay 118. The second opening 122 extends between the top end 118a and the bottom end 118b at the second side 114. For example, the second opening 122 can extend from the bottom end 118b towards the top end 118a. At least a portion of the second opening 122 is aligned with the lower bay portion 118f of the storage bay 118 along the longitudinal direction L. Thus, the second opening 122 is configured to receive the storage bin 110 therethrough along the longitudinal direction L and into the storage bay 118, such as into the lower bay portion 118f of the storage bay 118.

The shelving unit 108 can include, for each storage bay 118, a second barrier 126 at the second side 114 that is configured to limit (or prevent altogether) the likelihood that a human operator can reach through the storage bay 118 when a storage bin 110 is disposed in the storage bay 118. Thus, the barrier 126 and the storage bin 110 together can obstruct human access to the storage bay 118. The barrier 126 can extend between the upper end 118a and the second opening 122, such as from the upper end 118a to the second opening 122. At least a portion of the barrier 126 can be aligned with the upper bay portion 118e along the longitudinal direction L. Further, at least a portion of the barrier 126 can be aligned with the first opening 120 along the longitudinal direction L.

The barrier 126 can be implemented in any suitable manner so as to at least partially obstruct access to the upper bay portion 118e. For example, the barrier 126 can be implemented as a wall or plate that at least partially obstructs access to the upper bay portion 118e. In alternative embodiments, the barrier 126 can be implemented as a screen, a plurality of chains or bars, or any other suitable structure that is capable of at least partially obstructing access to the upper bay portion 118e. The barrier 126 can be positionally fixed relative to the storage bay 118 and relative to the frame 116. Thus, the barrier 126 can be considered to be a fixed barrier.

When the storage bin 110 is disposed in the storage bay 118, the barrier 126 is offset from the storage bin 110 with respect to the vertical direction V by a distance that is greater than or equal to zero. Thus, the barrier 126 can contact the top of the storage bin 110 such that no gap is present between the barrier 126 and the storage bin 110, or the barrier 126 can be spaced from the top of the storage bin 110 so as to define a non-zero gap between the barrier 126 and the storage bin 110. The non-zero gap can be sized so as to limit the likelihood that a human hand can be passed between the barrier 126 and the storage bin 110. Preferably the non-zero gap has a height along the vertical direction V that is less than a thickness of a hand from the palm to the back of the hand. For example, the gap can have a height less than or equal to two inches, less than or equal to one and one half inch, less than or equal to one inch, or less than or equal to one half inch.

The storage bays 118 in FIGS. 5 to 7 and FIGS. 8 to 10 each have a barrier mechanism 125 that includes a movable barrier 124 configured to move between an open position and a closed position. The barrier 124 can be in the open position when a storage bin 110 is disposed in the storage bay 118 (see e.g., FIGS. 7 and 10), such as when the barrier 124 is fully inserted into the storage bay 118. In the open position, at least a portion of the first opening 120 is open to the storage bay 118 so as to allow inventory items to be passed through the first opening 120 and into the open top of the storage bin 110. The barrier 124 can be in the closed position when the storage bin 110 is at least partially removed from the storage bay 118 (see e.g., FIGS. 5 and 8), wherein the barrier 124 at least partially obstructs the portion of the first opening 120.

The barrier 124 can be moved from the closed position to the open position by inserting the storage bin 110 into the storage bay 118. Thus, insertion of the storage bin 110 into the storage bay 118 can cause the barrier 124 to be moved to the open position. The barrier 124 can be moved from the open position to the closed position by at least partially removing the storage bin 110 from the storage bay 118. Thus, partial or complete removal of the storage bin 110 can cause the barrier 124 to be moved to the closed position. Consequently, when the storage bin 110 is removed, a pathway that extends through the second opening 122, the storage bay 118, and the first opening 120 is at least partially obstructed so as to limit the likelihood that a human operator can reach through the shelving unit 108 and come into contact with high-energy equipment (such as delivery vehicles 106) at the first side 112 of the shelving unit 108.

The barrier 124 can be implemented in any suitable manner so as to at least partially obstruct at least one of the first opening 120 and the second opening 122 when the barrier 124 is in the closed position. For example, the barrier 124 can be movable between the open position (e.g., FIGS. 7 and 10) and a closed position (FIGS. 5 and 8) to as to at least partially obstruct the first opening 120. In addition or alternatively, the barrier can be configured such that it is movable between an open position (not shown) and a closed position (not shown) so as to at least partially obstruct the second opening 122.

In some embodiments, the barrier 124 can be implemented as a plate that covers at least a portion, up to an entirety, of at least one of the first opening 120 and the second opening 122 when the barrier 124 is in the closed position. In alternative embodiments, the barrier 124 can be implemented as a screen, a plurality of chains or bars, or any other suitable structure that is capable of at least partially obstructing the at least one of the first opening 120 and the second opening 122 when the barrier 124 is in the closed position. The barrier 124 can have a first barrier end 124a and a second barrier end 124b that are offset from one another. For example, the first and second barrier ends 124a and 124b can be offset along the vertical direction V. The barrier mechanism 125 can include an actuator assembly 128 that is configured to move the barrier 124 between the open and closed positions.

Figure 5:
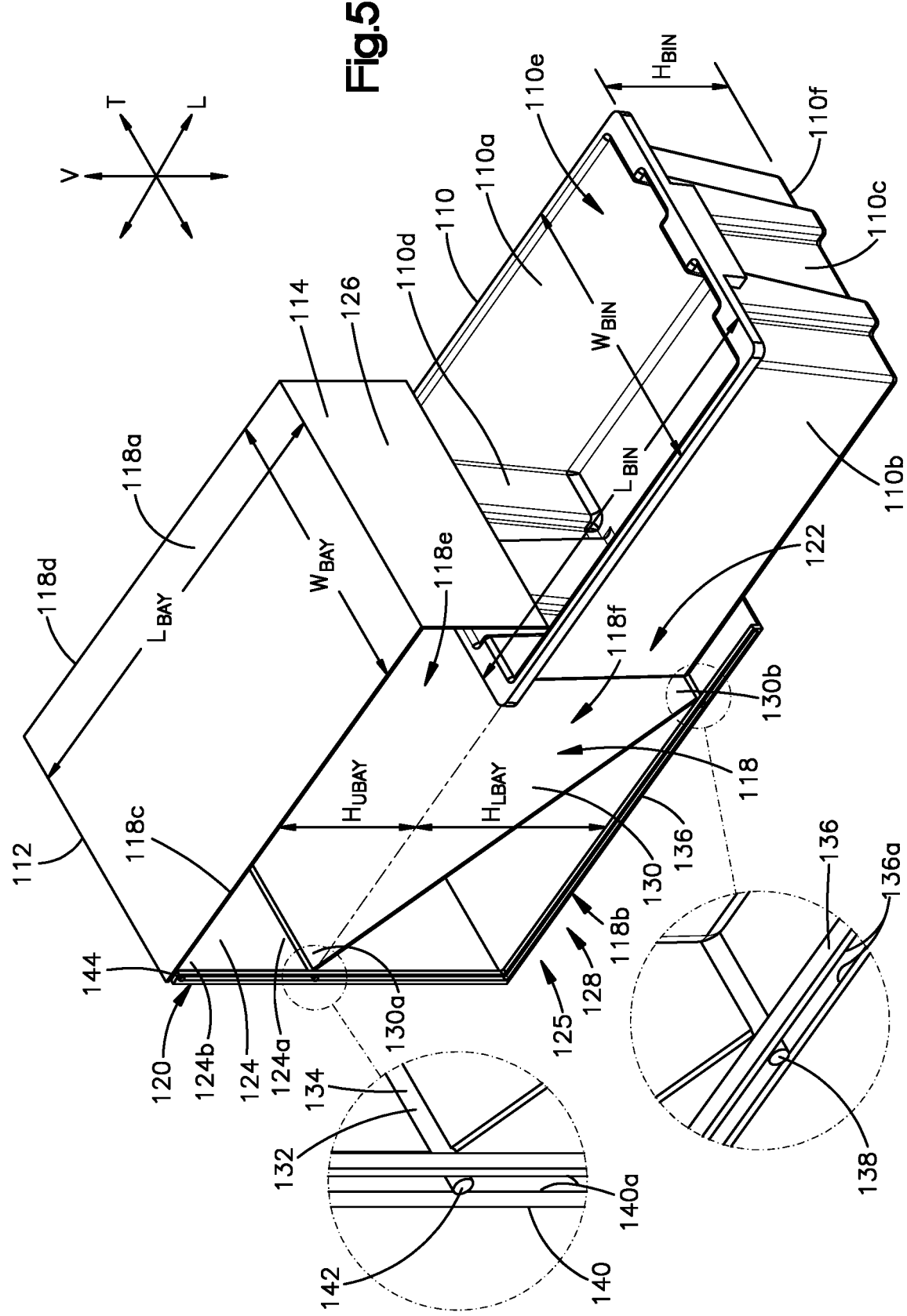
FIG. 5 shows a perspective view of a storage bay of a shelving unit of the sorting system of FIG. 1 according to one embodiment with a storage bin partially inserted into the storage bay.
Figure 6:
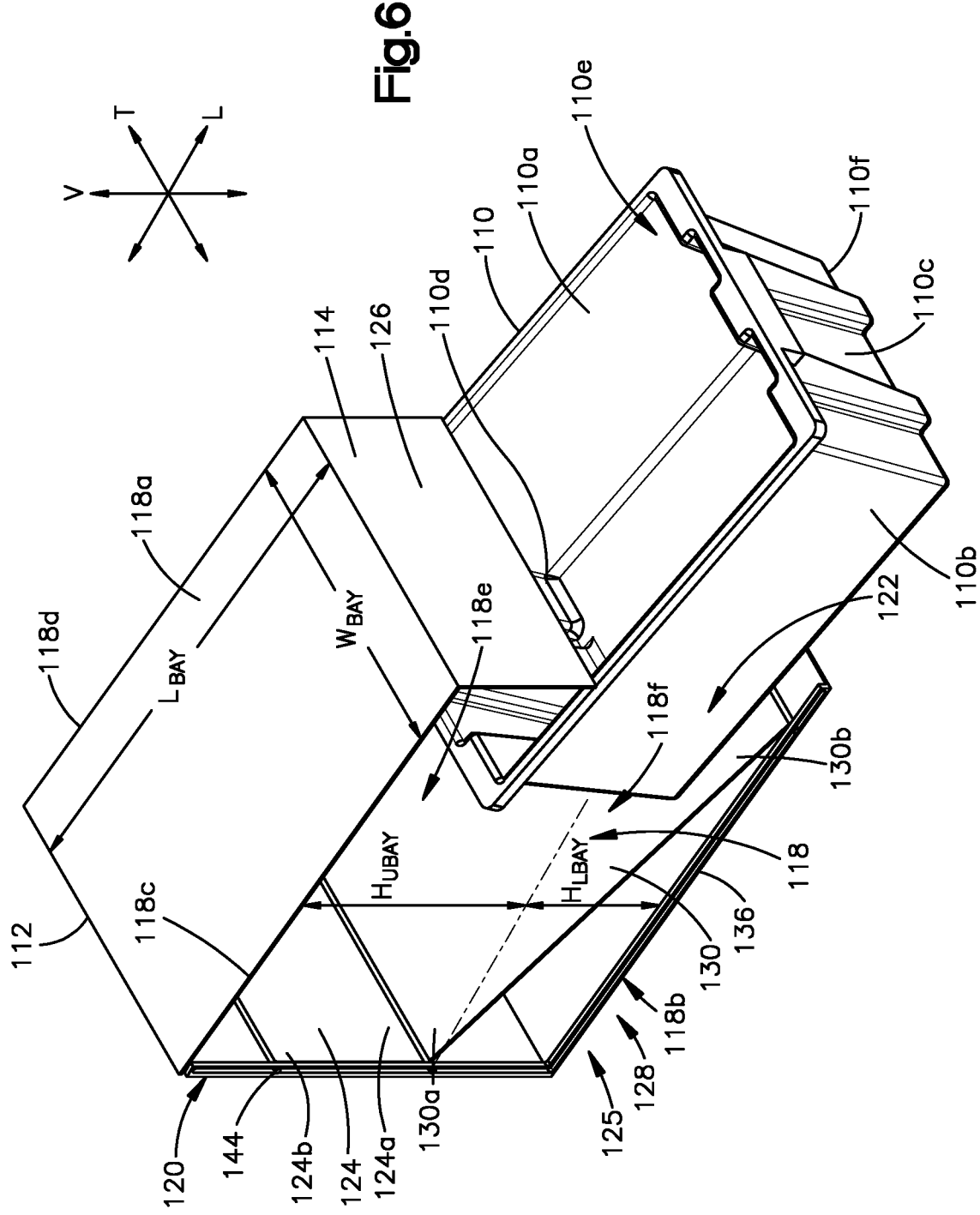
FIG. 6 shows a perspective view of the storage bay of FIG. 5 with the storage bin inserted further into the storage bay.
Figure 7:
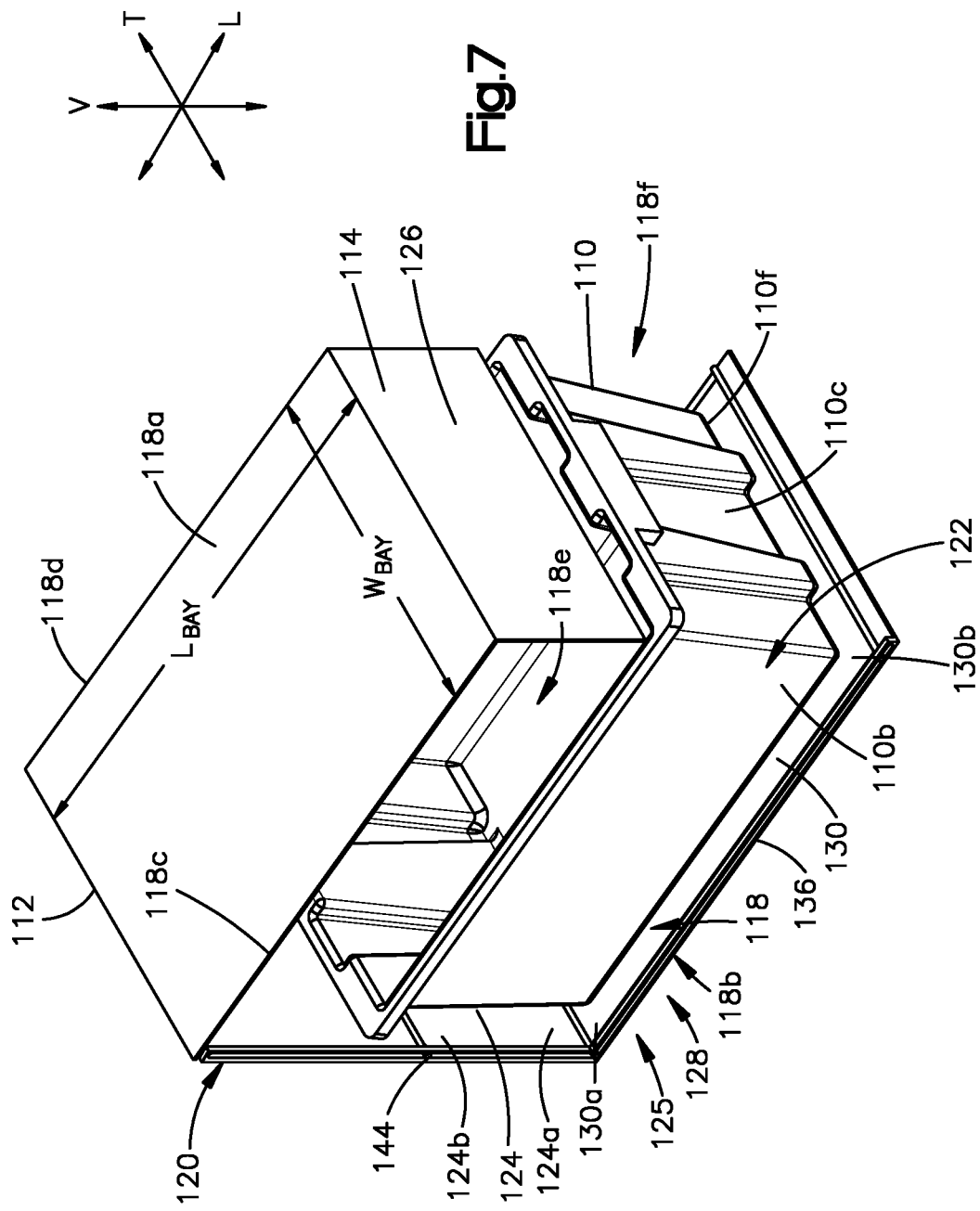
FIG. 7 shows a perspective view of the storage bay of FIG. 5 with the storage bin fully inserted into the storage bay.

Referring now more specifically to FIGS. 5 to 7, a storage bay 118 is shown that has a barrier mechanism 125 according to one embodiment. The barrier mechanism 125 includes the barrier 124 and an actuator assembly 128 that is configured to move the barrier 124 between the closed position (FIG. 5) and the open position (FIG. 7). For example, the actuator assembly 128 is configured to move the barrier 124 up along the vertical direction V to the closed position, and down along the vertical direction V to the open position. The actuator assembly 128 can be a mechanical actuator as shown, another type of mechanical actuator, an electric actuator, a hydraulic actuator, a pneumatic actuator, or any other suitable actuator that is configured to move the barrier 124 between the open and closed positions.

In one example, the actuator assembly 128 includes a link 130, which can be considered a first link. The barrier 124 can be considered a second link such that the link 130 and the barrier 124 together form a two-bar linkage. The link 130 is configured to move the barrier 124 from the closed position to the open position when a storage bin 110 engages the link 130. Thus, the link 130 can act as a pedal that moves the barrier 124 when the pedal is depressed. The link 130 can be implemented as a plate, a bar, or other suitable structure that is capable of moving the barrier 124 from the closed position to the open position when the link 130 is engaged by a storage bin 110. The link 130 can include a first end 130a and a second first end 130b that are offset from one another.

The link 130 can be coupled to the barrier 124 by a hinge 132. For example, the first end 130a and the first barrier end 124a can be coupled to one another at hinge 132. The hinge 132 can define an axis of rotation that extends along the transverse direction T. Thus, it can be said that the link 130 and the barrier 124 are rotationally coupled to one another. The actuator assembly 128 can include a biasing member 134 that biases the barrier 124 towards the closed position as shown in FIG. 5 such that the barrier 124 is normally closed. The biasing member 134 can include a spring, elastic band, inflatable, springy material, or other suitable biasing feature. In one example as shown, the biasing member 134 can be implemented as a torsional spring as part of the hinge 132. In other examples, the biasing member 134 can be implemented as a compression spring or tension spring that is coupled to at least one of link 130 and barrier 124 and that is configured to bias the barrier 124 towards the closed position.

The actuator assembly 128 can include at least one track, such as a plurality of tracks, configured to guide movement of the link 130 and the barrier 124 as the barrier 124 transitions between the open and closed positions. For example, the plurality of tracks can include a first track 140 that extends along the vertical direction V. The first track 140 can have at least one guide surface, such as a pair of internal guide surfaces 140a that oppose one another along the longitudinal direction L. The barrier 124, such as the first and second ends 124a and 124b of the barrier 124, and the first end 130a of the link 130 can be configured to translate along the first track 140 along the vertical direction V. In one example, the barrier assembly 125 can include a pin or wheel 144 that extends from the second end 124b of the barrier 124 along the transverse direction T, and a pin or wheel 142 that extends along the transverse direction T adjacent the hinge 132. The pins 142 and 144 can be configured to ride along the inner surfaces 140a of the first track 140 along the vertical direction V as the link 130 and barrier 124 move.

The plurality of tracks can include a second track 136 that extends along the longitudinal direction L. The second track 136 can have at least one guide surface, such as a pair of internal guide surfaces 136a, that oppose one another along the vertical direction V. The second end 130b of the link 130 can be configured to translate along the second track 136 along the longitudinal direction L as the link 130 moves. In one example, the actuator mechanism 128 can include a pin or wheel 138 that extends from the link 130 along the transverse direction T and into the second track 136. The pin or wheel 138 is configured to ride along the inner surfaces 136a of the second track 136 along the longitudinal direction L as the link 130 moves. It will be understood that the tracks 136 and 140 and the pins 138, 142, and 144 can be implemented at the first transverse side 118c of the storage bay 118. Additionally or alternatively, the tracks 136 and 140 and the pins 138, 142, and 144 can be implemented at the second transverse side 118d of the storage bay 118.

In the closed position (FIG. 5), the barrier 124 can extend along a plane that is defined by the vertical direction V and the transverse direction T. Further, the link 130 can extend from the barrier 124 along a direction that is angularly offset from the vertical direction V and the longitudinal direction L. In other words, the link 130 can be angled downwards towards the bottom end 118b of the storage bay 118 as the link 130 extends towards the second opening 122. In operation, the barrier 124 can be moved from the closed position to the open position as follows. As a storage bin 110 is pushed into the storage bay 118 through the second opening 122 along the longitudinal direction L, the storage bin 110 can push the first end 130a downward along the vertical direction V as shown in FIGS. 5 to 7. The downward movement of the first end 130a can cause the first and second barrier ends 124a and 124b of the barrier 124 to translate downwards along the vertical direction V along the track 140, and can cause the second first end 130b to translate along the longitudinal direction L towards the second opening 122.

In the open position (FIG. 7), the barrier 124 can extend along a plane that is defined by the vertical direction V and the transverse direction T. Further, the link 130 can extend from the barrier 124 along a substantially horizontal plane that extends in the longitudinal direction L and the transverse direction T. In operation, the barrier 124 can be moved from the open position to the closed position as follows. As the storage bin 110 is removed from the storage bay 118 through the second opening 122 along the longitudinal direction L, the biasing member 134 biases the first end 130a and the barrier 124 to translate upwards along the vertical direction V. Further, the second first end 130b translates along the longitudinal direction L towards the first side 112 of the shelving unit 108.

Figure 8:
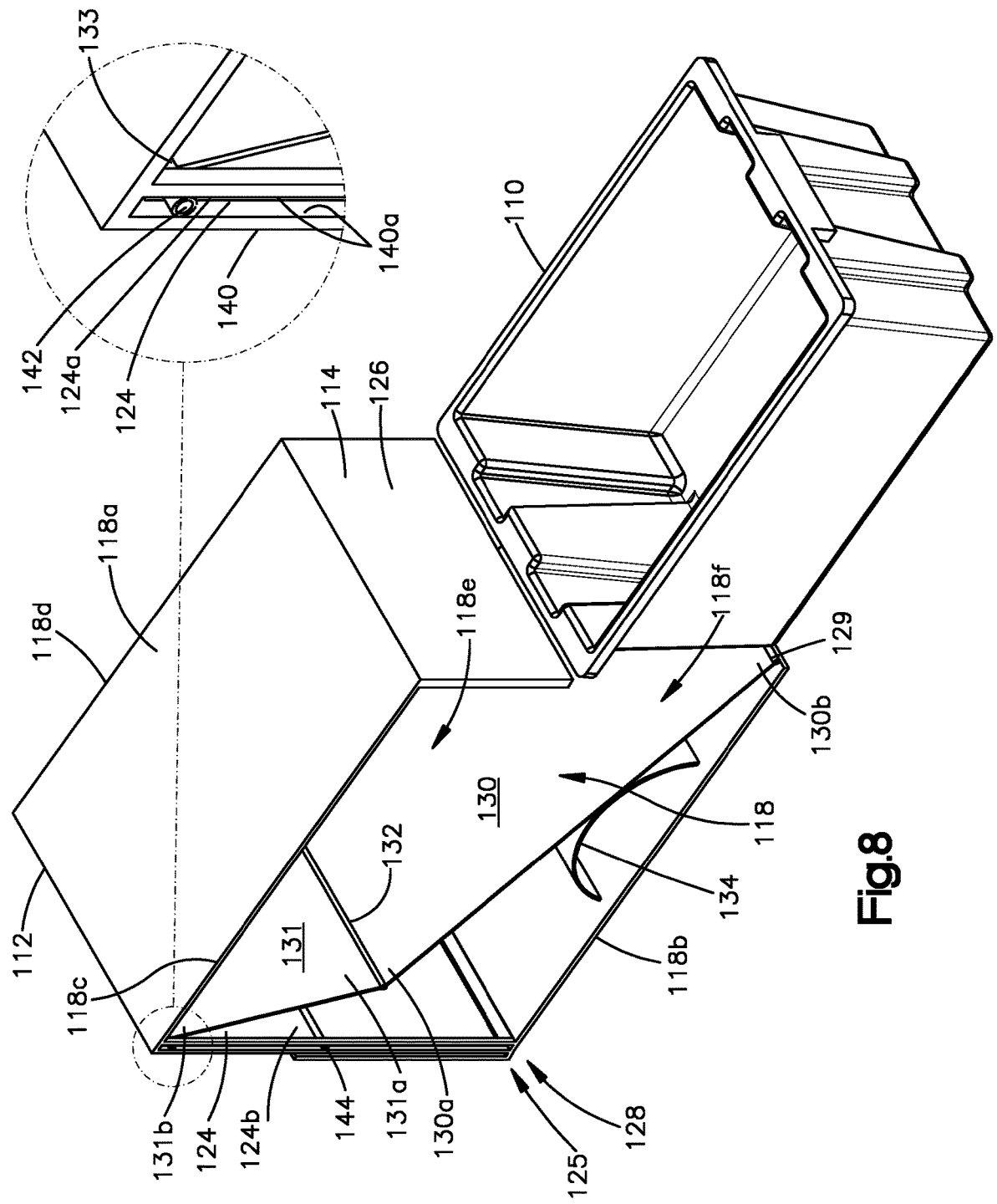
FIG. 8 shows a perspective view of a storage bay of a shelving unit of the sorting system of FIG. 1 according to another embodiment with a storage bin partially inserted into the storage bay.
Figure 9:
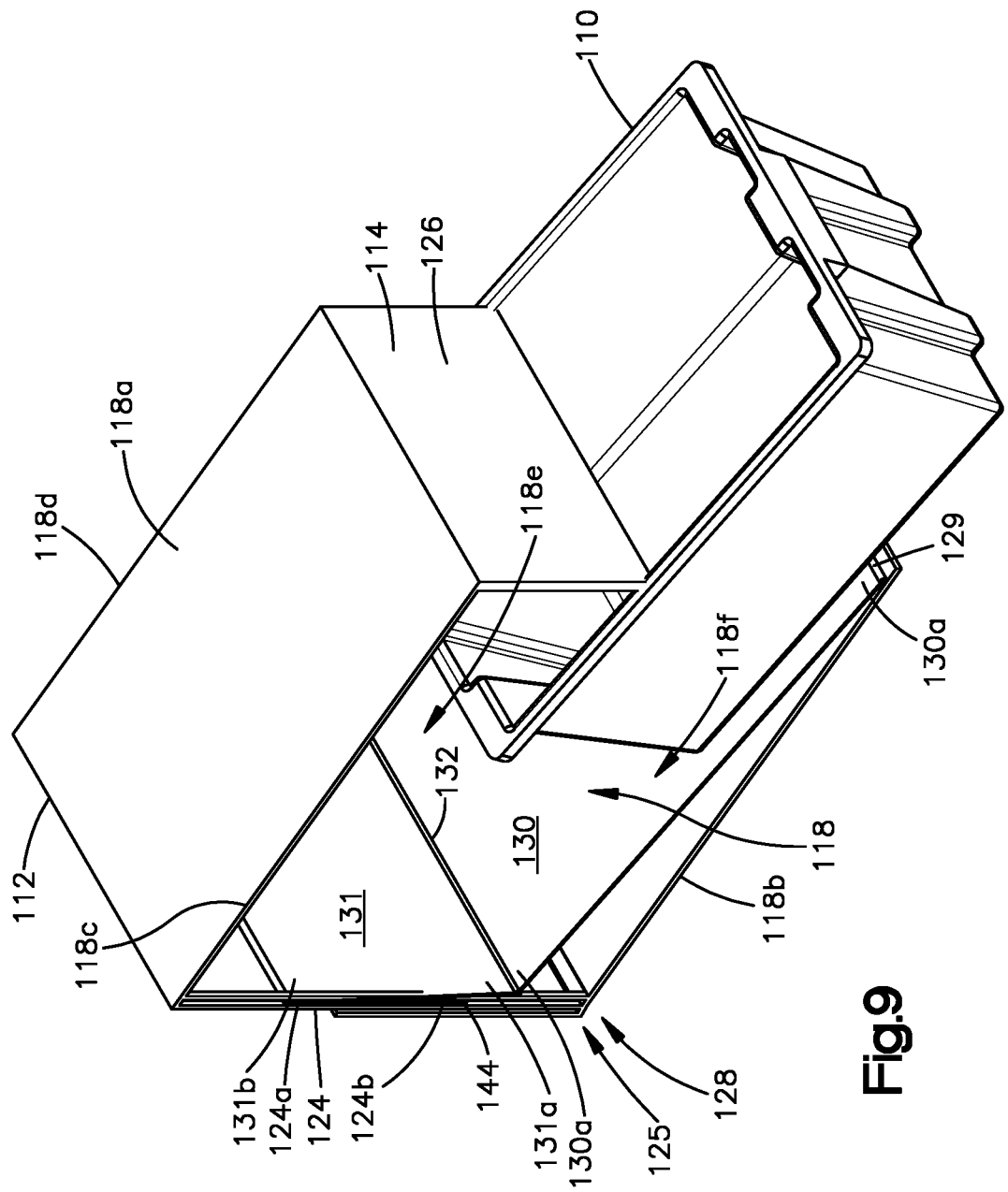
FIG. 9 shows a perspective view of the storage bay of FIG. 8 with the storage bin inserted further into the storage bay.
Figure 10:
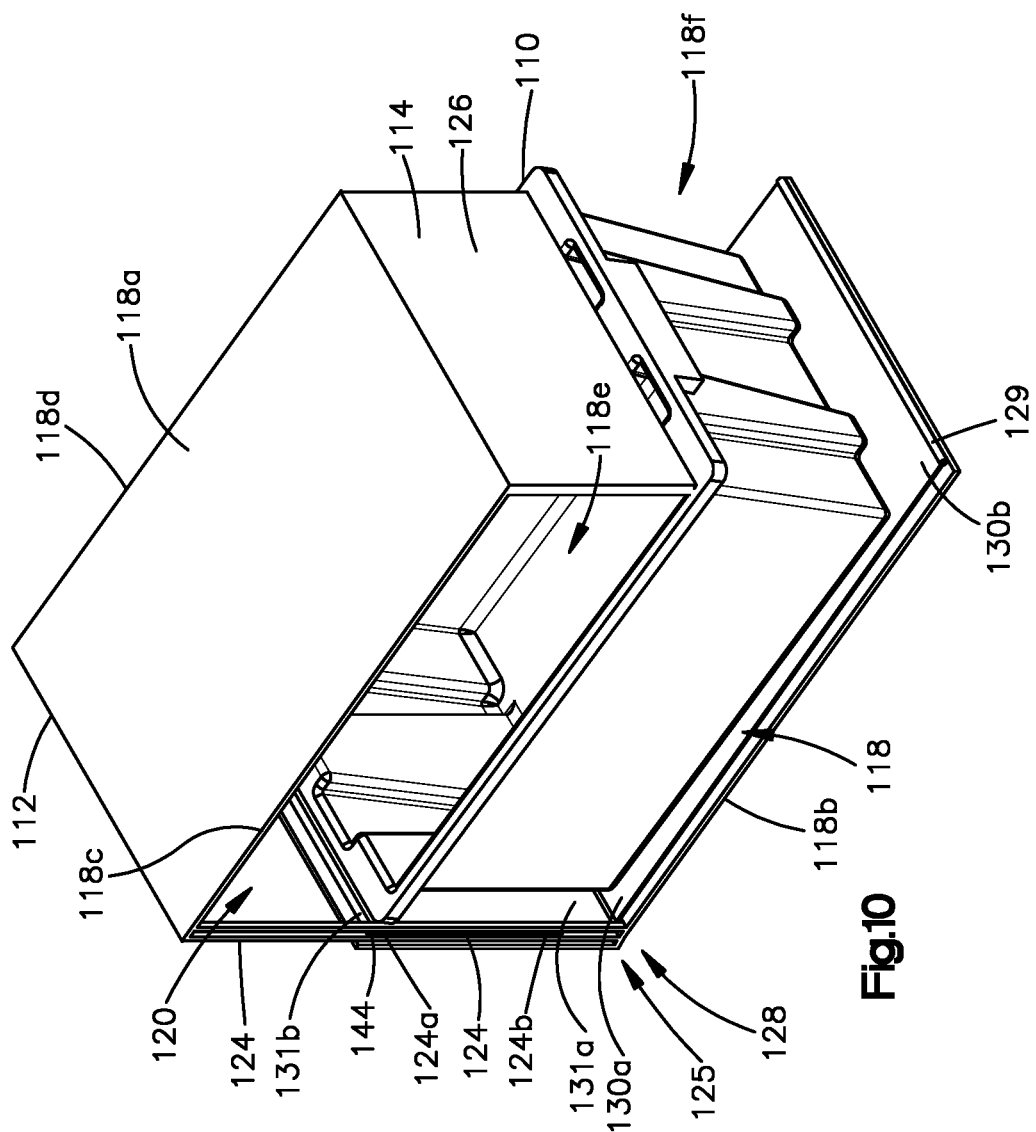
FIG. 10 shows a perspective view of the storage bay of FIG. 8 with the storage bin fully inserted into the storage bay.

Referring now more specifically to FIGS. 8 to 10, a storage bay 118 is shown that has a barrier mechanism 125 according to another embodiment. The barrier mechanism 125 includes the barrier 125 and an actuator assembly 128 that is configured to move the barrier 124 between the closed position (FIG. 8) and the open position (FIG. 10). For example, the actuator assembly 128 is configured to move the barrier 124 up along the vertical direction V to the closed position, and down along the vertical direction V to the open position. The actuator assembly 128 can be a mechanical actuator as shown, another type of mechanical actuator, an electric actuator, a hydraulic actuator, a pneumatic actuator, or any other suitable actuator that is configured to move the barrier 124 between the open and closed positions.

In one example, the actuator assembly 128 includes a first link 130 and a second link 131, and the barrier 124 defines a third link such that the first link 130, second link 131, and the barrier 124 together form a three-bar linkage. Each of the first and second links 130 and 132 can be implemented as a plate, a bar, or other suitable structure that is capable of moving the barrier 124 from the closed position to the open position when the first link 130 is depressed.

The first link 130 can include a first end 130a and a second first end 130b that are offset from one another. The second end 130b can be translatably fixed relative to the storage bay 118 and the frame 116 with respect to the longitudinal direction L, the vertical direction V, and the transverse direction T. However, the second end 130b can be configured to rotate about an axis that extends along the transverse direction T. For example, the actuator assembly 128 can include a hinge 129 that couples the second end 130b to the bottom end 118b of the storage bay 118. The hinge 129 can define an axis of rotation along the transverse direction T.

Similarly, the second link 131 can include a first end 131a and a second end 131b that are offset from one another. The first and second links 130 and 131 can be coupled to one another by a hinge 132. The hinge 132 can define an axis of rotation that extends along the transverse direction T. Thus, it can be said that the first and second links 130 and 131 are rotationally coupled to one another. The second link 131 can be coupled to the barrier 124 by a hinge 133. For example, the second end 131b and the first barrier end 124a can be coupled to one another at hinge 133. The hinge 133 can define an axis of rotation that extends along the transverse direction T. Thus, it can be said that the first link 130 and the barrier 124 are rotationally coupled to one another.

The actuator assembly 128 can include a biasing member 134 that biases the barrier 124 towards the closed position shown in FIG. 8 such that the barrier 124 is normally closed. The biasing member 134 can include a spring, elastic band, inflatable, springy material, or other suitable biasing feature. In one example as shown, the biasing member 134 can be implemented as a leaf spring that biases the link 130 upwards along the vertical direction V. In other examples, the biasing member 134 can be implemented as a torsional spring, a compression spring, or a tension spring that is coupled to at least one of first link 130, the second link 131, and the barrier 124 and that is configured to bias the barrier 124 towards the closed position.

The actuator assembly 128 can include at least one track configured to guide movement of the barrier 124 as the barrier 124 transitions between the open and closed positions. For example, the at least one track can include a track 140 that extends along the vertical direction V. The track 140 can have at least one guide surface, such as a pair of internal guide surfaces 140a that oppose one another along the longitudinal direction L. The barrier 124 (e.g., the ends 124a and 124b of the barrier 124) and the end 131b of the link 131 can be configured to translate along the track 140 along the vertical direction V.

The actuator assembly 128 can further include a plurality of pins or wheels that are configured to ride along the track 140 as the barrier 124 transitions between the open and closed positions. For example, the actuator assembly 128 can include a pin 142 that extends along the transverse direction T adjacent the hinge 133 and into the track 140. The pin 142 is configured to ride along the inner surfaces 140a of the track 140 along the vertical direction V as the barrier 124 moves. The actuator assembly 128 can include a pin 144 that extends from the barrier 124 along the transverse direction T and into the track 140. The pin 144 is configured to ride along inner surfaces 140a of the track 140 along the vertical direction V as the barrier 124 moves. It will be understood that the track 140 and the pins 142 and 144 can be implemented at the first transverse side 118c of the storage bay 118. Additionally or alternatively, the track 140 and the pins 142 and 144 can be implemented at the second transverse side 118d of the storage bay 118.

In the closed position (FIG. 8), the barrier 124 can extend along a plane that is defined by the vertical direction V and the transverse direction T. Further, the second link 131 can extend from the barrier 124 along a first direction that is angularly offset from the vertical direction V and the longitudinal direction L, and the link 130 can extend from the second link 131 along a second direction that is angularly offset from the vertical direction V and the longitudinal direction L. In other words, each of the first and second links 130 and 131 can be angled downwards towards the bottom end 118b of the storage bay 118 as the first and second links 130 and 131 extend towards the second opening 122.

In operation, the barrier 124 can be moved from the closed position to the open position as follows. As a storage bin 110 is pushed into the storage bay 118 through the second opening 122 along the longitudinal direction L, the storage bin 110 can push the first end 130a downward along the vertical direction V as shown in FIGS. 8 to 10. Unlike the embodiment in FIGS. 5 to 8, the second end 130b remains stationary and does not translate. The downward movement of the first end 130a can cause the second end 131b of the second link 131 to translate downwards along the vertical direction V. The downward movement of the second end 131b can cause the first and second barrier ends 124a and 124b of the barrier 124 to translate downwards along the vertical direction V along the track 140.

In the open position (FIG. 10), the barrier 124 can extend along a plane that is defined by the vertical direction V and the transverse direction T. The link 130 can extend along a substantially horizontal plane that extends in the longitudinal direction L and the transverse direction T. The second link 131 can extend along a substantially vertical plane that extends in the vertical direction V and the transverse direction T. In operation, the barrier 124 can be moved from the open position to the closed position as follows. As the storage bin 110 is removed from the storage bay 118 through the second opening 122 along the longitudinal direction L, the biasing member 134 biases the first end 130a to translate upwards along the vertical direction V. This in turn causes the second first end 131b to translates upwards along the vertical direction V, which causes the barrier 124 to translate upwards along the vertical direction V.

It should be noted that the illustrations and descriptions of the embodiments shown in the figures are for exemplary purposes only, and should not be construed limiting the disclosure. One skilled in the art will appreciate that the present disclosure contemplates various embodiments. Additionally, it should be understood that the concepts described above with the above-described embodiments may be employed alone or in combination with any of the other embodiments described above. It should further be appreciated that the various alternative embodiments described above with respect to one illustrated embodiment can apply to all embodiments as described herein, unless otherwise indicated.

Unless explicitly stated otherwise, each numerical value and range should be interpreted as being approximate as if the word "about" or "approximately" preceded the value or range.

It should be understood that the steps of exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

What is claimed:

1. An inventory processing system, comprising:
a track system;
a delivery vehicle configured to carry inventory items along the track system; and
a shelving unit that comprises:
an inner side adjacent the track system, and an outer side opposite the inner side;
a frame that defines a plurality of storage bays between the inner and outer sides, the storage bays arranged in rows and columns, each storage bay having an upper bay portion and a lower bay portion, wherein for each respective storage bay, (i) the frame defines a first opening at the inner side and a second opening at the outer side, (ii) the second opening is configured to receive a storage bin therethrough and into the lower bay portion of the respective storage bay, and (iii) the first opening is configured to receive inventory items from the delivery vehicle therethrough and into the storage bin when the storage bin is disposed in the respective storage bay; and
a plurality of barriers, each corresponding to a respective storage bay and configured to move between an open position when a respective storage bin is disposed in the respective storage bay such that the first opening of the respective storage bay is open to the respective storage bay to receive inventory items from the delivery vehicle, and a closed position when the respective storage bin is at least partially removed from the respective storage bay such that the barrier at least partially obstructs at least one of the first and second openings of the respective storage bay to impede a human body part from passing through the respective storage bay and contacting the delivery vehicle.

2. The inventory processing system of claim 1, wherein the shelving unit comprises a plurality of actuator assemblies, each corresponding to a respective barrier and each comprising a link that is configured to move the respective barrier between the open position and the closed position when a storage bin engages the link.

3. The inventory processing system of claim 1, wherein the shelving unit includes, for each respective storage bay, a second barrier at the outer side that is at least partially aligned with the upper bay portion of the respective storage bay and that is disposed above the second opening of the respective storage bay, wherein when the storage bin is received in the respective storage bay, the second barrier and the storage bin obstruct human access into the storage bay.

4. The inventory processing system of claim 1, comprising a plurality of biasing members, each one of the plurality of biasing members being configured to bias a respective one of the barriers towards the closed position.

5. The inventory processing system of claim 1, comprising a plurality of actuator assemblies, each configured to move a respective one of the barriers between the open and closed positions.

6. The inventory processing system of claim 5, wherein each actuator assembly is configured to move a respective one of the barriers from the closed position to the open position in response to a storage bin being inserted into a respective one of the storage bays.

7. A shelving unit configured to support inventory items, the shelving unit comprising:
a first side, and a second side opposite the first side;
a frame that defines a storage bay between the first and second sides, a first opening at the first side, and a second opening at the second side, the second opening configured to receive a storage bin therethrough and into the storage bay, and the first opening configured to receive inventory items therethrough and into the storage bin when the storage bin is disposed in the storage bay; and
a barrier configured to move between (i) an open position when the storage bin is disposed in the storage bay, wherein the first opening is open to the storage bay so as to allow inventory items to be passed through the first opening and into the storage bin, and (ii) a closed position when the storage bin is at least partially removed from the storage bay, wherein the barrier at least partially obstructs at least one of the first and second openings.

8. The shelving unit of claim 7, wherein the storage bay has a lower bay portion configured to support the storage bin therein and an upper bay portion disposed above the lower bay portion, the upper bay portion defining a void that is sized and configured to receive inventory items therethrough and into the storage bin when the storage bin is disposed in the lower bay portion.

9. The shelving unit of claim 8, wherein the upper bay portion is at least partially aligned with first opening and the lower bay portion is at least partially aligned with the second opening.

10. The shelving unit of claim 8, comprising a second barrier at the second side that is at least partially aligned with the upper bay portion and that is disposed above the second opening, wherein when the storage bin is received in the storage bay, the second barrier and the storage bin together obstruct access into the storage bay.

11. The shelving unit of claim 10, comprising the storage bin, wherein when the storage bin is received in the storage bay, the storage bin and the second barrier are offset from one another along the vertical direction by a distance that is less than a thickness of a hand from a palm of the hand to a back of the hand.

12. The shelving unit of claim 7, comprising a biasing member that biases the barrier towards the closed position.

13. The shelving unit of claim 7, comprising an actuator assembly that is configured to move the barrier between the open and closed positions.

14. The shelving unit of claim 13, wherein the actuator assembly is configured to move the barrier from the closed position to the open position in response to the storage bin being inserted into the storage bay.

15. The shelving unit of 13, wherein the actuator assembly includes a track that extends along a vertical direction, and the barrier is configured to translate along the track along the vertical direction between the open and closed positions.

16. The shelving unit of claim 13, wherein the actuator assembly includes a first link that forms a pedal, and the first link is configured such that when the storage bin is inserted into the storage bay, the storage bin depresses the first link to thereby move the barrier to the open position.

17. The shelving unit of claim 16, wherein the first link has a first end and a second end, and the first link is angled downwards from the first end towards the second end as the first link extends towards the second opening.

18. The shelving unit of claim 17, wherein the actuator assembly includes a horizontal track, and the second end of the first link is configured to translate along the horizontal track when the storage bin depresses the first link.

19. The shelving unit of claim 7, wherein the frame defines a plurality of instances of the storage bay that are arranged in rows and columns, and the shelving unit comprises a plurality of instances of the barrier, each corresponding to one of the instances of the storage bay.

20. An inventory processing system, comprising:
the shelving unit of claim 7;
a track system disposed at the first side of the shelving unit; and
at least one delivery vehicle configured to carry inventory items along the track system and deliver the inventory items to the storage bin through the first opening, wherein when the barrier is in the closed position, the barrier obstructs a pathway that extends through the second opening, the storage bay, and the first opening.

* * * * *